US 8,228,215 B1
Jul. 24, 2012

(12) United States Patent
Runge

(54) IDENTIFYING MISREPRESENTED CHARACTERS IN STRINGS OF TEXT

(75) Inventor: Norbert Runge, San Jose, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 12/825,659

(22) Filed: Jun. 29, 2010

(51) Int. Cl.
*H03M 7/00* (2006.01)

(52) U.S. Cl. ........... 341/82; 341/83; 341/90; 715/249; 715/255; 715/256

(58) Field of Classification Search ............ 341/82, 341/83, 90; 715/249, 255, 256
See application file for complete search history.

(56) References Cited

U.S. PATENT DOCUMENTS

| | | | | |
|---|---|---|---|---|
| 4,701,744 A * | 10/1987 | DeVilbiss | ............ | 341/90 |
| 7,132,962 B1 * | 11/2006 | Degenhardt et al. | ............ | 341/50 |
| 7,356,764 B2 * | 4/2008 | Radja et al. | ............ | 715/234 |
| 7,437,667 B2 * | 10/2008 | Storisteanu | ............ | 715/255 |
| 7,522,075 B2 * | 4/2009 | Mak | ............ | 341/90 |
| 7,831,908 B2 * | 11/2010 | Danilo | ............ | 715/245 |
| 7,924,182 B2 * | 4/2011 | Maluf et al. | ............ | 341/82 |
| 2002/0120764 A1 * | 8/2002 | Rader | ............ | 709/230 |
| 2003/0043257 A1 * | 3/2003 | Umeki et al. | ............ | 347/251 |
| 2003/0046257 A1 * | 3/2003 | Atkin | ............ | 707/1 |
| 2004/0044791 A1 * | 3/2004 | Pouzzner | ............ | 709/245 |
| 2006/0265649 A1 * | 11/2006 | Danilo | ............ | 715/542 |
| 2010/0174716 A1 * | 7/2010 | Elbaz et al. | ............ | 707/737 |
| 2011/0252475 A1 * | 10/2011 | Mui et al. | ............ | 726/23 |

OTHER PUBLICATIONS

Ruby, Sam, Survival guide to i18n, 'intertwingly—It's just data,', http:\\interwingly.net/stories/2004/04/14/i18n.html, downloaded Mar. 5, 2010.

* cited by examiner

*Primary Examiner* — Linh Nguyen
(74) *Attorney, Agent, or Firm* — Harness, Dickey & Pierce, P.L.C.

(57) ABSTRACT

Methods, systems, and apparatus, including computer programs encoded on a computer storage medium, for identifying misrepresented characters in strings of text. A computer system receives text that includes characters identified as being encoded in UTF-8. The characters are represented as code point values, each code point value representing one character in the text. The computer system makes a determination that the text likely includes characters incorrectly converted from Win-1252 to UTF-8 by comparing the code point values that represent the text with test values. Based on the comparison, the computer system identifies sequences of characters in the text that was likely incorrectly converted.

30 Claims, 12 Drawing Sheets

Die Nordsee - Home

Wer auch immer Sie sind, was auch immer Sie für Urlaubswünsche haben:  Die
Nordsee erfüllt sie!
www.die-nordsee.de/ - Im Cache - Ähnlich

⌐ 200
205
205
205

Die Nordsee - Home

Wer auch immer Sie sind, was auch immer Sie fÃ¼r UrlaubswÃ¼nsche haben:  Die Nordsee
erfÃ¼llt sie!
www.die-nordsee.de/ - 23k - Im Cache - Ähnliche Seiten

| Win-1252 hex code/First UTF-8 byte | E0 | E1 | E2 | E3 | E4 | E5 | E6 | E7 | E8 | E9 | EA | EB | EC | ED | EE | EF |
|---|---|---|---|---|---|---|---|---|---|---|---|---|---|---|---|---|
| Win-1252 character | à | á | â | ã | ä | å | æ | ç | è | é | ê | ë | ì | í | î | ï |
| UTF-8 encoding (hex code) | C3 A0 | C3 A1 | C3 A2 | C3 A3 | C3 A4 | C3 A5 | C3 A6 | C3 A7 | C3 A8 | C3 A9 | C3 AA | C3 AB | C3 AC | C3 AD | C3 AE | C3 AF |
| UTF-16 encoding (hex code) | 00 E0 | 00 E1 | 00 E2 | 00 E3 | 00 E4 | 00 E5 | 00 E6 | 00 E7 | 00 E8 | 00 E9 | 00 EA | 00 EB | 00 EC | 00 ED | 00 EE | 00 EF |

Character Set 1/Range 1

FIG. 3

| Win-1252 hex code/Second or Third UTF-8 byte | A0 | A1 | A2 | A3 | A4 | A5 | A6 | A7 | A8 | A9 | AA | AB | AC | AD | AE | AF |
|---|---|---|---|---|---|---|---|---|---|---|---|---|---|---|---|---|
| Win-1252 character | NBSP | ¡ | ¢ | £ | ¤ | ¥ | ¦ | § | ¨ | © | ª | « | ¬ | SHY | ® | ¯ |
| UTF-8 encoding (hex code) | C2 A0 | C2 A1 | C2 A2 | C2 A3 | C2 A4 | C2 A5 | C2 A6 | C2 A7 | C2 A8 | C2 A9 | C2 AA | C2 AB | C2 AC | C2 AD | C2 AE | C2 AF |
| UTF-16 encoding (hex code) | 00 A0 | 00 A1 | 00 A2 | 00 A3 | 00 A4 | 00 A5 | 00 A6 | 00 A7 | 00 A8 | 00 A9 | 00 AA | 00 AB | 00 AC | 00 AD | 00 AE | 00 AF |

Character Set 2/Range 1

| Win-1252 hex code/Second or Third UTF-8 byte | B0 | B1 | B2 | B3 | B4 | B5 | B6 | B7 | B8 | B9 | BA | BB | BC | BD | BE | BF |
|---|---|---|---|---|---|---|---|---|---|---|---|---|---|---|---|---|
| Win-1252 character | ° | ± | 2 | 3 | ´ | µ | ¶ | · | ¸ | 1 | º | » | ¼ | ½ | ¾ | ¿ |
| UTF-8 encoding (hex code) | C2 B0 | C2 B1 | C2 B2 | C2 B3 | C2 B4 | C2 B5 | C2 B6 | C2 B7 | C2 B8 | C2 B9 | C2 BA | C2 BB | C2 BC | C2 BD | C2 BE | C2 BF |
| UTF-16 encoding (hex code) | 00 B0 | 00 B1 | 00 B2 | 00 B3 | 00 B4 | 00 B5 | 00 B6 | 00 B7 | 00 B8 | 00 B9 | 00 BA | 00 BB | 00 BC | 00 BD | 00 BE | 00 BF |

Character Set 2/Range 2

| Win-1252 hex code/Second or Third UTF-8 byte | 80 | 81 | 82 | 83 | 84 | 85 | 86 | 87 | 88 | 89 | 8A | 8B | 8C | 8D | 8E | 8F |
|---|---|---|---|---|---|---|---|---|---|---|---|---|---|---|---|---|
| Win-1252 character | € | N/A | ‚ | ƒ | „ | … | † | ‡ | ˆ | ‰ | Š | ‹ | Œ | N/A | Ž | N/A |
| UTF-8 encoding (hex code) | E2 82 AC | N/A | E2 80 9A | C6 92 | E2 80 9E | E2 80 26 | E2 80 20 | E2 80 21 | CB 86 | E2 80 B0 | C5 A0 | E2 80 B9 | C5 92 | N/A | C5 BD | N/A |
| UTF-16 encoding (hex code) | 20 AC | N/A | 20 1A | 01 92 | 20 1E | 20 26 | 20 20 | 20 21 | 02 C6 | 20 30 | 01 60 | 20 39 | 01 52 | N/A | 01 7D | N/A |

Character Set 2/Range 3

FIG. 4C

| Win-1252 hex code/Second or Third UTF-8 byte | 90 | 91 | 92 | 93 | 94 | 95 | 96 | 97 | 98 | 99 | 9A | 9B | 9C | 9D | 9E | 9F |
|---|---|---|---|---|---|---|---|---|---|---|---|---|---|---|---|---|
| Win-1252 character | N/A | ' | ' | " | " | • | – | — | ˜ | ™ | š | › | œ | N/A | ž | Ÿ |
| UTF-8 encoding (hex code) | N/A | E2 80 98 | E2 80 99 | E2 80 9C | E2 80 9D | E2 80 A2 | E2 80 93 | E2 80 94 | CB 9C | E2 84 A2 | C5 A1 | E2 80 BA | C5 93 | N/A | C5 BE | C5 B8 |
| UTF-16 encoding (hex code) | N/A | 20 18 | 20 19 | 20 1C | 20 1D | 20 22 | 20 13 | 20 14 | 02 DC | 21 22 | 01 61 | 20 3A | 01 53 | N/A | 01 7E | 01 78 |

415

Character Set 2/Range 4

FIG. 4D

| Win-1252 hex code/First UTF-8 byte | C0 | C1 | C2 | C3 | C4 | C5 | C6 | C7 | C8 | C9 | CA | CB | CC | CD | CE | CF |
|---|---|---|---|---|---|---|---|---|---|---|---|---|---|---|---|---|
| Win-1252 character | À | Á | Â | Ã | Ä | Å | Æ | Ç | È | É | Ê | Ë | Ì | Í | Î | Ï |
| UTF-8 encoding (hex code) | C3 80 | C3 81 | C3 82 | C3 83 | C3 84 | C3 85 | C3 86 | C3 87 | C3 88 | C3 89 | C3 8A | C3 8B | C3 8C | C3 8D | C3 8E | C3 8F |
| UTF-16 encoding (hex code) | 00 C0 | 00 C1 | 00 C2 | 00 C3 | 00 C4 | 00 C5 | 00 C6 | 00 C7 | 00 C8 | 00 C9 | 00 CA | 00 CB | 00 CC | 00 CD | 00 CE | 00 CF |

Character Set 3/Range 1

FIG. 6A

| Win-1252 hex code/First UTF-8 byte | D0 | D1 | D2 | D3 | D4 | D5 | D6 | D7 | D8 | D9 | DA | DB | DC | DD | DE | DF |
|---|---|---|---|---|---|---|---|---|---|---|---|---|---|---|---|---|
| Win-1252 character | Ð | Ñ | Ò | Ó | Ô | Õ | Ö | × | Ø | Ù | Ú | Û | Ü | Ý | Þ | ß |
| UTF-8 encoding (hex code) | C3 90 | C3 91 | C3 92 | C3 93 | C3 94 | C3 95 | C3 96 | C3 97 | C3 98 | C3 99 | C3 9A | C3 9B | C3 9C | C3 9D | C3 9E | C3 9F |
| UTF-16 encoding (hex code) | 00 D0 | 00 D1 | 00 D2 | 00 D3 | 00 D4 | 00 D5 | 00 D6 | 00 D7 | 00 D8 | 00 D9 | 00 DA | 00 DB | 00 DC | 00 DD | 00 DE | 00 DF |

Character Set 3/Range 2

FIG. 6B

IDENTIFYING MISREPRESENTED CHARACTERS IN STRINGS OF TEXT

BACKGROUND

This specification relates to displaying characters encoded in digital encoding formats.

Text editors executed by computer systems can be used to perform operations such as receiving text as input, displaying the text in a user interface, editing the received text, and the like. Computer systems can perform operations including storing and processing text that includes one or more strings of characters. Characters are stored as numbers based on one of several encoding formats. The Universal Character Set (UCS) defined by the International Organization for Standardization is a standard set of characters upon which many encoding formats are based. Examples of encoding formats include 8-bit Unicode Transformation Format (UTF-8) encoding format, 16-bit Unicode Transformation Format (UTF-16), and Windows-1252 (Win-1252). Different text editors can encode text in different encoding formats. For example, Hypertext Markup Language (HTML) editors can generally encode characters in UTF-8 encoding format. Extensible Markup Language (XML) editors can generally encode characters in Win-1252 encoding format.

In some scenarios, characters encoded in one encoding format can be received for display in a text editor or other program configured to encode text in another encoding format. To display the characters, the program can convert the text in the one encoding format to the other encoding format. In some scenarios, characters received in a string of text can be mistaken as being in the one encoding format, and erroneously converted into the other encoding format. This erroneous conversion, which may be referred to as a "double-conversion", can cause characters to be misrepresented when displayed.

SUMMARY

This specification describes technologies relating to identifying misrepresented characters in strings of text.

One innovative aspect of the subject matter described here can be implemented as a method executed by a computer system including one or more computers. A first set of test values, a second set of test values, and a third set of test values are obtained. Text including characters represented as code point values is received. The characters are identified as being in a first encoding format. Each code point value represents one character in the text. A determination is made that the text likely includes characters incorrectly converted from a second encoding format to the first encoding format. Making the determination includes one of two steps. In a first step, for a sequence of code point values consisting of a first code point value followed by a second code point value, it is determined that the first code point value is in the first set of test values and that the second code point value is in the second set of test values. In an alternative step, for a sequence of code point values consisting of a first code point value followed by a second code point value followed by a third code point value, it is determined that the first code point value is in the third set of test values, that the second code point value is in the second set of test values, and that the third code point value is in the second set of test values.

This, and other aspects, can include one or more of the following features. Making the determination can include both the first step and the alternative step. The first encoding format can be 8-bit Unicode Transformation Format (UTF-8) and the second encoding format is Windows-1252 (Win-1252). The sequence of code point values consisting of the first code point value followed by the second code point value can represent a two-byte character encoded in UTF-8 encoding format. The first set of test values can match a bit mask having a format 110x xxxx, and can include hexadecimal values in Win-1252 encoding format. Hexadecimal values C or D match a first half-byte of the bit mask and one of hexadecimal values 0-F match a second half-byte of the bit mask. The first set of test values can further include hexadecimal values in UTF-8 encoding format. Each hexadecimal value in UTF-8 encoding format can represent a code point value of a character in Win-1252 encoding format represented by a test value included in the first set of test values. The second set of test values can match a bit mask having a format 10xx xxxx, and includes hexadecimal values in Win-1252 encoding format. Hexadecimal values 8, 9, A, or B can match a first half-byte of the bit mask and one of hexadecimal values O-F can match a second half-byte of the bit mask. The third set of test values can match a bit mask having a format 1110 xxxx, and include hexadecimal values in Win-1252 encoding format. A first half-byte of the bit mask can always be E and one of hexadecimal values 0-F can match a second half-byte of the bit mask. The text including characters can further be divided into one or more two-character or three-character sub-sequences. Each sub-sequence can include consecutive characters in the received text. Code point values representing multiple two-character and three-character sub-sequences that represent text that has not been incorrectly converted from the second encoding format to the first encoding format can be stored. Making the determination can include (iii) determining that the sequence of code point values consisting of the first code point value followed by the second code point value is not included in the stored code point values, or (iv) determining that the sequence of code point values consisting of the first code point value followed by the second code point value followed by the third code point value is not included in the stored code point values.

Other innovative aspects of the subject matter described here can be implemented as a computer-readable medium storing computer software instructions executable by a computer system including one or more computers to perform the operations described above. Further innovative aspects of the subject matter described here can be implemented as a system that includes a computer system including one or more computers, and a computer-readable medium storing computer software instructions executable by the computer system to perform operations described above.

Particular implementations of the subject matter described in this specification can be implemented so as to realize one or more of the following advantages. The techniques described here can be used to detect misrepresentation of text (text garbling) caused by double-conversion. The correctness and aesthetic appearance of text in text editors can be improved by identifying the misrepresented text. The techniques can be customized to prevent false positive detections, i.e., the detection of correctly represented text that is mistaken as being misrepresented. By doing so, a likelihood that a string of text that is identified as being misrepresented is actually misrepresented can be increased.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 shows correct and incorrect representation of text in UTF-8.

FIG. 3 shows a first set of code point test values that are potential matches for a first byte of a three-byte UTF-8 character.

FIGS. 4A-4D show a second set of code point test values that are potential matches for a second or a third byte of a three-byte UTF-8 character or a second byte of a two-byte UTF-8 character.

FIGS. 6A and 6B show a third set of code point test values that are potential matches for a first byte of a two-byte UTF-8 character.

Like reference numbers and designations in the various drawings indicate like elements.

DETAILED DESCRIPTION

Generally, when a computer program, executed by a computer system, receives a string of characters, it is received in a particular encoding format. To display the string of characters, the computer program may or may not convert the string into a different encoding format. For example, if the computer program receives the string of characters and the program infers that the string is encoded in the Win-1252 encoding format, and if the program is configured to display text in the UTF-8 encoding format, the computer program will convert the string from Win-1252 to UTF-8. If the inference is incorrect, characters in the string will be misrepresented. Generally, this issue arises in small strings of characters within larger bodies of text.

Double UTF-8 conversion occurs when a character encoded in UTF-8 encoding format is interpreted as a character encoded in a non-UTF-8 encoding format and converted to UTF-8 encoding format (presumably for a second time, thus the reference to "double" conversion). Specifically, bytes of the character encoded in the UTF-8 encoding format are interpreted as bytes from the non-UTF-8 encoding format. For example, in the UTF-8 encoding format, an em-dash character (—) is encoded as a three-byte character with an encoding value xE28094. In some situations, the em-dash character, which is encoded in UTF-8 encoding, is interpreted to be in Win-1252 encoding format and converted to UTF-8 encoding format. Win-1252 encoding format is a single byte encoding in which each byte stands for a character. In some situations, in UTF-8 encoding format, two or three bytes can represent a character. As a consequence, each of the three bytes of the em-dash character (xE2 x80 x94) are interpreted as a corresponding character in the Win-1252 encoding format (â€"). Subsequently, each of these three characters is converted to UTF-8 encoding format (xC3 xA2 xE2 x82 xAC xE2 x80 x9D). Because of the double-conversion, what was once a single character represented by a three-byte UTF-8 encoding is misrepresented as three characters that are collectively represented by eight bytes. Thus, for example, the text 'all-in-one' is misrepresented, and displayed, for example, in a web browser, as 'all â€" in â€" one'.

Figure 1:
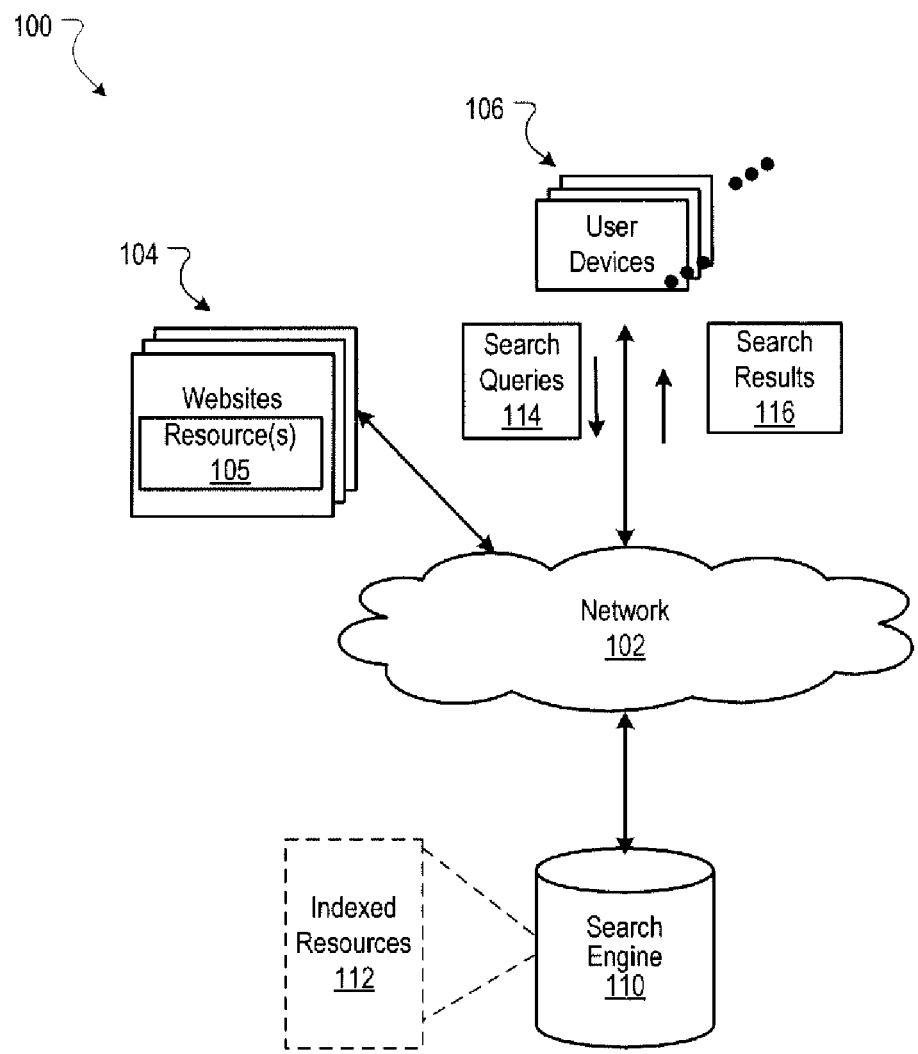
FIG. 1 is a schematic diagram of an example environment in which misrepresentation of text can be identified.

FIG. 1 shows a schematic diagram of an example environment 100 in which misrepresentation of text can be identified. A computer network 102, for example, a local area network (LAN), wide area network (WAN), a mobile phone network, the Internet, or a combination of them, connects web sites 104, user devices 106, and a search engine 110. The environment 100 may include many thousands of web sites 104 and user devices 106. A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, for example, a web browser or other communication software, to facilitate the sending and receiving of resources over the network 102. Some user applications are configured to display text, and, in some cases, to permit editing.

A web site 104 is one or more resources 105 associated with a domain name, and one or more servers host each web site. A resource 105 is any data that can be provided by the web site 104 over the network 102 and that is associated with a resource address. Resources include HTML pages, word processing documents, portable document format (PDF) documents, image, audio and video files, and the like. The resources can include content, for example, text (i.e., words, phrases), pictures, and the like, and may include other embedded information (such as meta information and hyperlinks) and/or embedded instructions (such as JavaScript scripts). Each resource is addressed by a resource address, e.g., a universal resource locator (URL). A resource address is generally a string of characters that identifies a resource 105 on a web site 104.

Thus, a search result is data generated by the search engine 110 that identifies a resource that satisfies a particular search query, and generally includes a link to the resource. In many cases, the search result includes text extracted from the identified resource. The extracted text in a search result can be encoded in the search result in an encoding format that is the same as or different from the encoding format used in the resource from which the text was extracted. Double-conversion can occur when the search result is being generated to include text extracted from the identified resource. Such double-converted text can be seen when the search results is displayed. An example search result displaying double-converted text is described with reference to FIG. 2.

FIG. 2 shows correct and incorrect representation of text in UTF-8. As shown in FIG. 2, a search result 200 can include a web page title, a snippet of text extracted from the web page, and the URL of the web page. In the absence of double-conversion, the extracted text is displayed correctly in the search results. For example, the text extracted from the web page is German text that includes the character "ü" 205 (appearing three times). In the absence of double-conversion, the character "ü" 205 is represented correctly in the search result 200. Sometimes, the character "ü" 205 is double-converted when the character is extracted from a resource and included in the search result 200. For example, the search result 250 shows character "ü" 205 double-converted and incorrectly represented as "Ã¼" 255 (appearing twice). Double-conversion can occur when a computer system, for example, the search engine 110, applies a conversion to UTF-8 to text that is already encoded in UTF-8. For example, if the search engine 110 extracts multiple characters of text encoded in UTF-8 from a source resource (for example, a web page that the search engine determines as satisfying the search query), misinterprets the extracted text as being encoded in Win-1252, converts the extracted text into UTF-8 (double-conversion), and includes the double-converted text in a target resource, for example, a web page displaying search results, then double-conversion has occurred.

The techniques described with reference to the following figures relate to identifying misrepresented characters. In some cases, the characters are encoded in UTF-8 but have been misinterpreted as being encoded in Win-1252.

As will be described with reference to FIGS. 5 and 7, a computer system receives text including characters encoded in UTF-8. The text can include any combination of one-byte, two-byte, three-byte, or four-byte UTF-8 characters. For each character included in the text, the computer system identifies a code point value in UTF-8 and matches the identified code point value against a set of test values. For example, if the computer system receives "à", then the computer system can identify a code point value of the character "à" in UTF-8, namely xC3A0. The set of test values with which the computer system can match the identified code point value in UTF-8 can include code point values in Win-1252, code point values in UTF-8, and code point values in UTF-16. In the example below, a three-character sequence included in a string of text is analyzed. Analysis of a two-character sequence included in a string is described later.

If code point values of each character in a three character sequence included in a string of text are found in the test values, then the computer system makes a determination that the text likely includes a three-byte character originally encoded in UTF-8 encoding format misinterpreted as being in Win-1252 format and incorrectly having had a Win-1252 to UTF-8 encoding format conversion performed on them. The test values against which the identified code point values are matched are described below.

The first, second, and third byte of a three-byte UTF-8 character are represented by the bit masks 1110 xxxx, 10xx xxxx, and 10xx xxxx, respectively. The first and second byte of a two-byte UTF-8 character are represented by the bit masks 110x xxxx and 10xx xxxx, respectively. Each bit on the positions marked with "x" in the bit mask can be either zero or one in the UTF-8 encoding format.

Given the properties of UTF-8 encoding, some but not all characters encoded in UTF-8 bytes can be interpreted as having been encoded in Win-1252. Thus, when the bytes of UTF-8 encoded characters are interpreted as Win-1252 encoded characters, less than the entire character set encoded in Win-1252 can appear to be characters encoded in UTF-8 bytes. When a string of characters is received, a determination is made that a Win-1252 to UTF-8 conversion has likely been made on a two-byte UTF-8 encoded character that was a part of the string and that was incorrectly interpreted as being in Win-1252. Such a determination is made by determining, for a code point value consisting of a first code point byte followed by a second code point byte, that the first code point byte is included in a first set of test values and that the second code point value is in a second set of test values. Similarly, a determination is made that a Win-1252 to UTF-8 conversion has likely been made on a three-byte UTF-8 encoded character that was part of the string and that was incorrectly interpreted as being in Win-1252. Such a determination is made by determining, for a code point value consisting of a first code point byte followed by a second code point byte followed by a third code point byte, that the first code point byte is in a third set of test values, that the second code point value is in the second set of test values, and that the third code point byte is in the second set of test values. The first, second, and third test values are described with reference to FIGS. 3 and 4A-4D for the three-byte UTF-8 characters and with reference to FIGS. 4A-4D and 6A-6B for the two-byte UTF-8 characters, respectively.

FIG. 3 shows a first set of code point test values that are potential matches for a first byte of a three-byte UTF-8 character. The first set of code point test values (Character Set 1/Range 1) are values that can be interpreted as the first byte of a three-byte character encoded in UTF-8 encoding format. For such a first byte, the first half-byte (bit mask 1110) is always hexadecimal value xE. The second half-byte (bit mask xxxx) can be any hexadecimal value between xE0 to xEF (16 characters).

For example, if the first byte has the value xE0, which, in Win-1252 encoding format represents "à", then when this character is misinterpreted as being in Win-1252 and converted to UTF-8, the encoding value is xC3A0. Similarly, if the first byte has the value xE1, which, in Win-1252 encoding format represents "á", then the code point value of xE1 upon conversion to UTF-8 is xC3A1. Code point test values that are potential matches for a second byte or a third byte of a three-byte UTF-8 character are described with reference to FIGS. 4A-4D.

FIGS. 4A-4D show a second set of code point test values that are potential matches for a second or a third byte of a three-byte UTF-8 character or a second byte of a two-byte UTF-8 character. The second or the third byte can match hexadecimal values x8, x9, xA, or xB for the first half-byte and any of hexadecimal values x0-xF for the second half-byte, thereby yielding four ranges (Character Set 2/Range 1-Character Set 2/Range 4) of test values corresponding to each possible match for the first half-byte. Character Set 2/Range 1 (FIG. 4A) and Character Set 2/Range 2 (FIG. 4B) include test values 400 and 405, respectively, for when the first half-byte is hexadecimal value xA and xB, respectively.

For example, if the second byte has the value xA2, which, in Win 1252 encoding format represents "¢", then when this character is misinterpreted as being in Win 1252 and converted to UTF 8, the encoding value is xC2A2, as shown in the test values 400. Similarly, if the second byte has the value xB1, which, in Win 1252 encoding format represents "±", then when this character is misinterpreted as being in Win 1252 and converted to UTF 8, the encoding value is xC2B1, as shown in the test values 405.

Character Set 2/Range 3 (FIG. 4C) and Character Set 2/Range 4 (FIG. 4D) include test values 410 and 415, for when the first half-byte is hexadecimal value x8 and x9, respectively. For example, if the second byte has the value x80, which, in Win 1252 encoding format represents "€", then when this character is misinterpreted as being in Win 1252 and converted to UTF 8, the encoding value is xE282AC, as shown in test values 410. Similarly, if the second byte has the value x99, which, in Win 1252 encoding format represents "™", then when this character is misinterpreted as being in Win 1252 and converted to UTF 8, the encoding value is xE284A2, as shown in test values 415.

For these two ranges, there are 5 code point values (3 in the Character Set 2/Range 3 and 2 in the Character Set 2/Range 4) to which a character is not assigned in the Win-1252 encoding format. In other words, if any of these code point values, that is in UTF-8 encoding format, is misinterpreted as being in Win-1252 encoding format, then when a Win-1252 to UTF-8 encoding conversion is performed on them, there is no corresponding character in UTF-8 encoding by which the converted code point value can be represented. For example, if the second byte has the value x81, then when this character is misinterpreted as being in Win-1252, there is no corresponding character in UTF-8 encoding by which x81 can be represented. Similarly, for example, if the second byte has the value x90, then when this character is misinterpreted as being in Win 1252, there is no corresponding character in UTF-8 encoding by which x90 can be represented. In such scenarios, when conversion occurs, the code point values are represented as replacement characters encoded in UTF-8 encoding format. A Unicode Replacement Character (URC) is an example of a replacement character.

Figure 5:
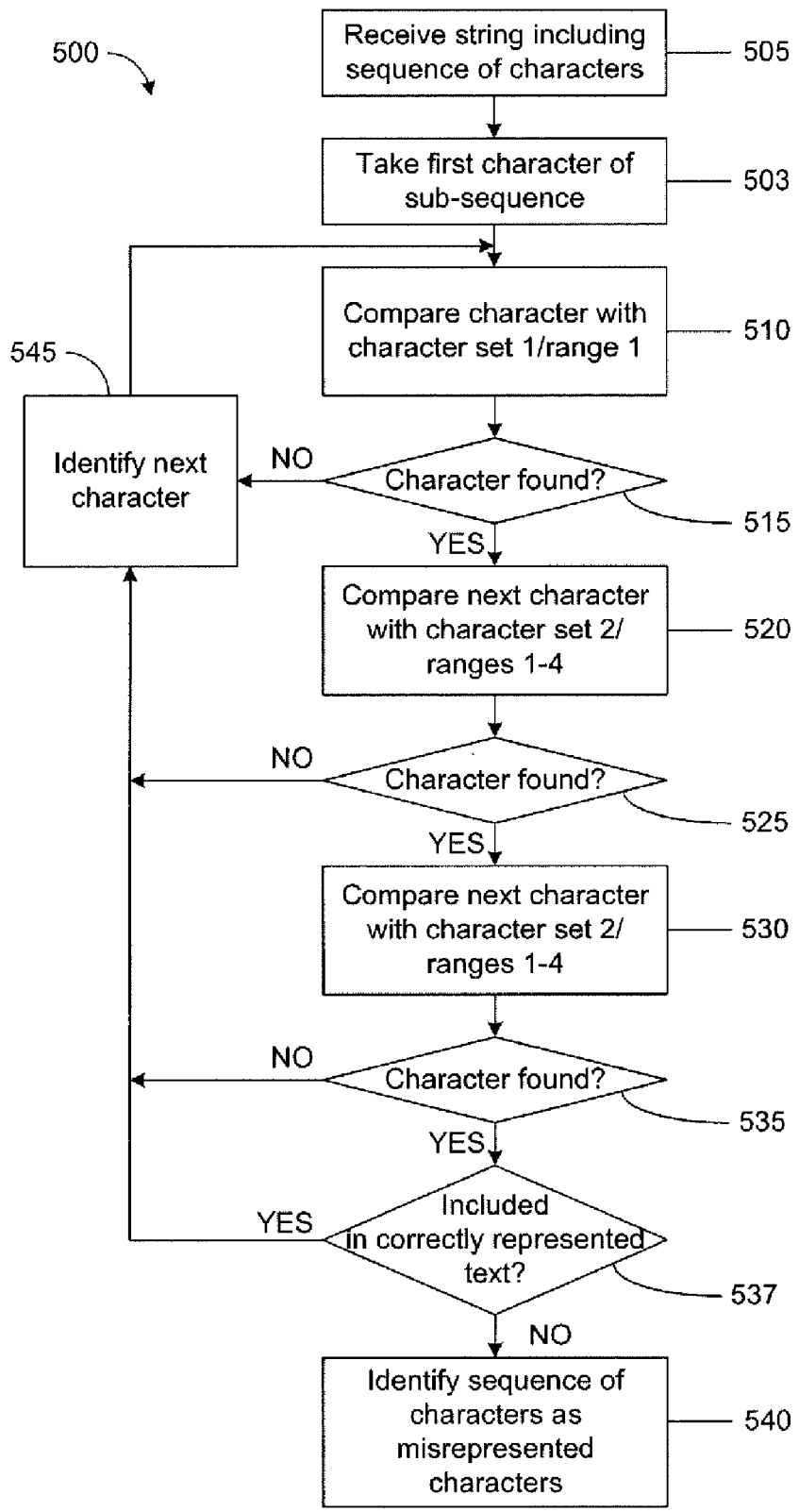
FIG. 5 is a flowchart of an example process for determining likelihood that a three-byte UTF-8 character has been double converted.

FIG. 5 shows a flowchart of an example process 500 for determining a likelihood that a three-byte UTF-8 character has been double converted. The process 500 can be performed by a programmed computer system that includes one or more computers. The process 500 receives a string including a sequence of characters (step 505). For example, the computer system receives a sequence of code point values representing the sequence of characters. In some implementations, the computer system can divide the sequence of characters into multiple sub-sequences each consisting of three consecutive characters. Two such sub-sequences can have overlapping characters. For example, a 4-character string can be divided into two sub-sequences, one made up of characters 1, 2 and 3, and the other, of characters 2, 3 and 4. Further, in some implementations, to identify a code point value of a character, for example, each character in a sub-sequence, the computer system can execute a getCodePoint( ) function for a character. In some implementations, the computer system can execute a "codePointAt(i)" Java function that operates on a string and returns the code point value (i.e., an integer value) of the i-th character of the string.

The process 500 takes the first character of a sub-sequence (step 503) and compares the character with Character Set 1/Range 1 (step 510) and determines if the code point value of the first character is found in Character Set 1/Range 1 (step 515). If the character is not found, then the process 500 can identify the next character in the received sequence of characters (step 545).

If the code point value of the first character in the sub-sequence is found in Character Set 1/Range 1 ("yes" branch from decision step 515), then the process 500 compares the second character with Character Set 2/Ranges 1-4 (step 520). For example, if the code point value of the first character in a sub-sequence is found in Character Set 1/Range 1, the computer system can determine if the code point value of the second character in the sub-sequence is found in any one of Character Set 2/Ranges 1-4. If the code point value is not found in Character Set 1/Range 1 ("no" branch from decision step 515), then the process 500 identifies the next character in the received sequence of characters (step 545). In other words, the computer system concludes that the sub-sequence has not been double-converted and analyzes the next sub-sequence. The process 500 can then repeat the comparison step (step 510).

If the code point value of the second character in the sub-sequence is found in Character Set 2/Ranges 1-4 ("yes" branch from decision step 525), then the process 500 compares the third character also with Character Set 2/Ranges 1-4 (step 530). If the code point value is not found in Character Set 2/Ranges 1-4, then the process 500 identifies the next character in the received sequence of characters (step 545). The process 500 concludes that the sub-sequence has not been double-converted.

If the code point value of the third character in the sub-sequence is found in Character Set 2/Ranges 1-4 ("yes" branch from decision step 535), then the process 500 determines if the sub-sequence is included in a storage for storing correctly represented text, described with reference to FIG. 8.

The correctly represented text includes one or more sub-sequences of three-byte characters that are not misrepresented. In other words, even though the code point value of the first character in the sub-sequence is found in the first set of test values and the code point values of the second and third characters in the sub-sequence are found in the second set of test values, the sub-sequence of characters may not have been double-converted, but rather, the sub-sequence may properly occur. If the sub-sequence is not found in the storage that stores correctly represented text ("no" branch from decision 537), then the process 500 identifies the sequence of three characters as misrepresented characters (step 540). In other words, the computer system makes a determination that the received sequence of characters likely includes three-byte characters incorrectly interpreted as being encoded in Win-1252 and converted to UTF-8. In some implementations, the computer system can additionally present the sub-sequence consisting of three consecutive characters to a viewer. For example, the computer system can display the received string of characters and present the sub-sequence in a manner that is easily discernible to a viewer of the display. Two-byte characters encoded in UTF-8 encoding format can be analyzed in a similar manner, as described below.

FIGS. 6A and 6B show a set of test values that are potential matches for a first byte of a two-byte UTF-8 character. The first byte of a two-byte UTF-8 character has the following format: 110x xxxx. Thus, the first half-byte can match hexadecimal values xC or xD and the second half-byte can match any of hexadecimal values x0-xF, thereby yielding two ranges (Character Set 3/Range 1 and Character Set 3/Range 2) of test values corresponding to each possible match for the first half-byte. Character Set 3/Range 1 (FIG. 6A) and Character Set 3/Range 2 (FIG. 6B) include test values 600 and 605, respectively, for when the first half-byte is hexadecimal value xC and xD, respectively. For example, if the first byte has the value xC2, which, in Win 1252 encoding format represents "Â", then when this character is misinterpreted as being in Win 1252 and converted to UTF 8, the encoding value is xC382, as shown in test values 600. Similarly, for example, if the first byte has the value xD7, which in Win 1252 encoding format represents "×", then when this character is misinterpreted as being in Win 1252 and converted to UTF 8, the encoding value is xC397, as shown in test values 605.

The second byte of a two-byte character encoded in UTF-8 has the following format: 10xx xxxx. Thus, the first half-byte can match hexadecimal values x8, x9, xA, or xB for and the second half-byte can match any of hexadecimal values x0-xF. The ranges of test values 400, 405, 410, and 415 corresponding to possible matches for the second byte are shown in FIGS. 4A-4D.

Figure 7:
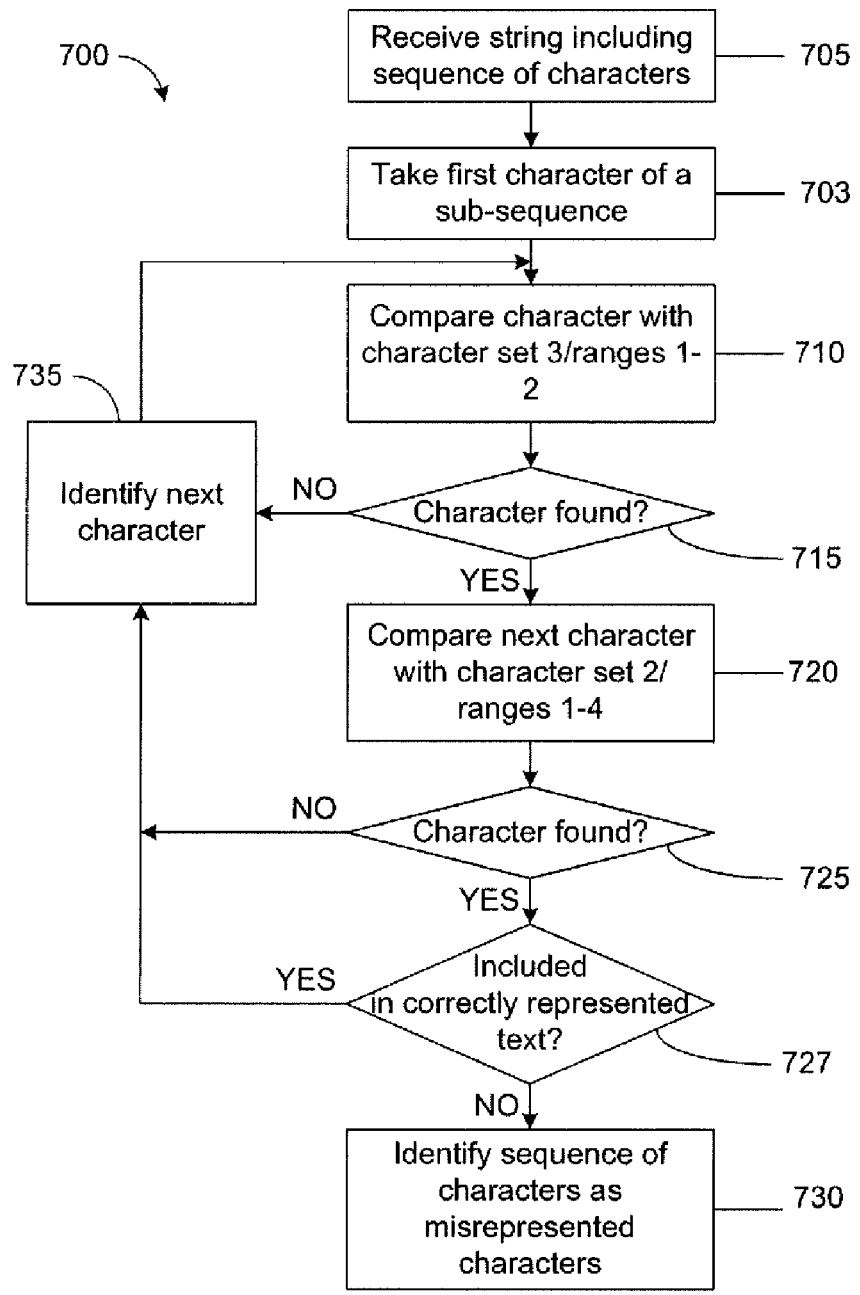
FIG. 7 is a flowchart of an example process for determining likelihood that a two-byte UTF-8 character has been double converted.

FIG. 7 shows a flowchart of an example process 700 for determining likelihood that a two-byte UTF-8 character has been double-converted. The process 700 can be implemented, for example, in a computer-readable medium storing software program instructions executable by a computer system that includes one or more computers. The process 700 receives a string including a sequence of characters at 705. In some implementations, the computer system can divide the sequence of characters into multiple sub-sequences each consisting of two consecutive characters. Two sub-sequences can have overlapping characters. For example, a 3-character string can be divided into two sub-sequences, each including characters 1 and 2, and characters 2 and 3.

The process 700 takes the first character of a sub-sequence (step 703) and compares the character with Character Set 3/Ranges 1-2 (step 710). As a first step in determining if a two-byte character encoded in UTF-8 encoding format has been misinterpreted as being in Win-1252 encoding format and converted to UTF-8 encoding format, the computer system can determine if the code point value of the first character in a sub-sequence is found in Character Set 3/Ranges 1-2 (step 715). If the character is not found, then the process 700 identifies the next character in the received sequence of characters (step 735). For example, if the code point value of a first character in the sub-sequence is not found in Character Set 3/Ranges 1-2, the computer system concludes that the sub-sequence has not been double-converted. The process 700 can then repeat the comparison step (step 710) with the next character of the sub-sequence.

If the code point value of the first character in the sub-sequence is found in Character Set 3/Ranges 1-2 (at 715), then the process 700 compares the second character with Character Set 2/Ranges 1-4 at 720. If the code point value is not found in Character Set 3/Ranges 1-2 ("no" branch from decision step 725), then the process 700 identifies the next character in the received sequence of characters (step 735). In other words, the computer system concludes that the sub-sequence has not been double-converted and analyzes the next sub-sequence.

If the code point value of the second character in the sub-sequence is found in Character Set 2/Ranges 1-4 (step 725), then the process 700 determines if the sub-sequence is included in data identifying correctly represented text, described with reference to FIG. 8. If the sub-sequence is not found in the storage that stores correctly represented text ("no" branch from decision 727), then the process 700 identifies the sequence of two characters as misrepresented characters (step 730). In other words, the computer system makes a determination that the received sequence of characters likely includes two-byte characters incorrectly interpreted as being in Win-1252 and converted to UTF-8. In some implementations, the computer system can additionally present the sub-sequence consisting of two consecutive characters to a viewer. For example, the computer system can display the received string of characters and present the sub-sequence in a manner that is easily discernible to a viewer of the display.

In some situations, the presence of the first code point byte in the first set of test values and the second code point byte in the second set of test values may not mean that the sub-sequence of characters has been double-converted. In other words, even though the first code point byte is found in the first set of test values and the second code point byte is found in the second set of test values, the sub-sequence of characters may not have been double-converted, but rather, the sub-sequence may properly occur. For example, a publisher of a resource may have included the characters in the sub-sequence and the search engine 110 may have correctly interpreted the characters. To address such scenarios, a list of correctly represented text can be implemented, as described with reference to FIG. 8.

Figure 8:
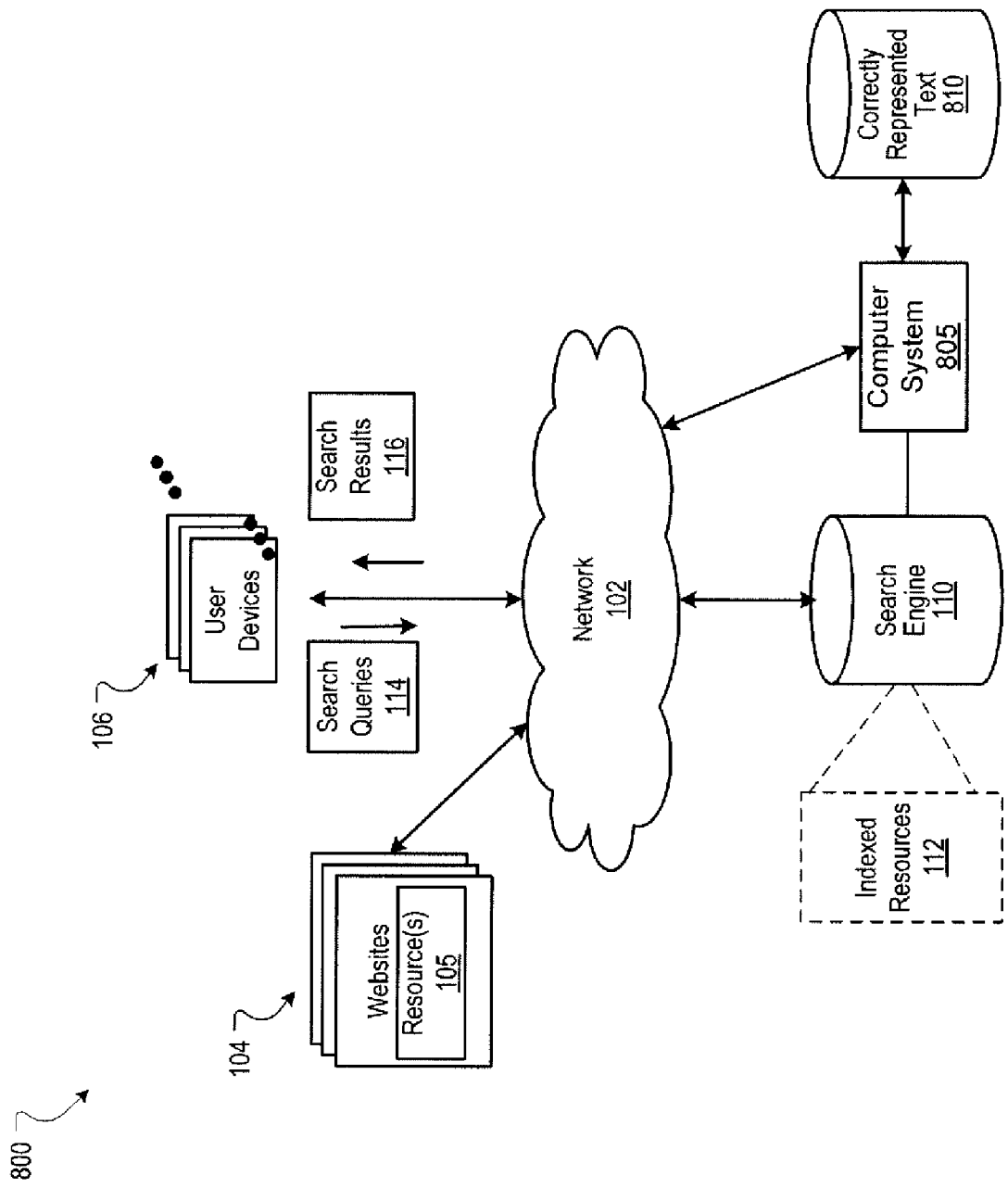
FIG. 8 is a schematic diagram of an example environment including a storage for storing correctly represented text.

FIG. 8 shows a schematic diagram of an example environment 800 including a storage for storing correctly represented text. The example environment includes a computer system 805 configured to execute computer program instructions, stored on a computer-readable medium, to perform the aforementioned processes. The computer system 805 is operatively coupled to a computer-readable and computer-searchable data storage device 810 that stores data identifying correctly represented text. The data includes the following strings of text—NESTLÉ®, süβ<<, weiβ", drauβ'—and may include others. When the computer system 805 encounters any of the correctly represented strings of text identified by the data, the computer system 805 will make a determination, using one of the processes described above, that the encountered string of text has been double-converted. The computer system 805 then checks if the encountered string is identified by the data identifying correctly represented text. If yes, then the computer system 805 will instead conclude that the encountered string has not been double-converted.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the computer system can identify the code point value of a character in UTF 16 encoding format rather than in UTF 8 encoding format for ease of operation.

What is claimed is:

1. A method comprising:
   obtaining, by a computer system including one or more computers, a first set of test values, a second set of test values, and a third set of test values;
   receiving, by the computer system, text comprising characters represented as code point values, the characters identified as being in a first encoding format, each code point value representing one character in the text; and
   making a determination by the computer system that the text likely includes characters incorrectly converted from a second encoding format to the first encoding format, wherein making the determination includes (i) determining for a sequence of code point values consisting of a first code point value followed by a second code point value that the first code point value is in the first set of test values and that the second code point value is in the second set of test values, or (ii) determining for a sequence of code point values consisting of a first code point value followed by a second code point value followed by a third code point value that the first code point value is in the third set of test values, that the second code point value is in the second set of test values, and that the third code point value is in the second set of test values.

2. The method of claim 1, wherein making the determination includes the determining of step (i) and the determining of step (ii).

3. The method of claim 1, wherein the first encoding format is 8-bit Unicode Transformation Format (UTF-8) and the second encoding format is Windows-1252 (Win-1252).

4. The method of claim 3, wherein the sequence of code point values consisting of the first code point value followed by the second code point value represents a two-byte character encoded in UTF-8 encoding format.

5. The method of claim 1, wherein the first set of test values matches a bit mask having a format 110x xxxx, and includes hexadecimal values in Win-1252 encoding format, wherein hexadecimal values C or D matches a first half-byte of the bit mask and one of hexadecimal values 0-F matches a second half-byte of the bit mask.

6. The method of claim 5, wherein the first set of test values further includes hexadecimal values in UTF-8 encoding format, each representing a code point value of a character in Win-1252 encoding format represented by a test value included in the first set of test values.

7. The method of claim 1, wherein the second set of test values matches a bit mask having a format 10xx xxxx, and includes hexadecimal values in Win-1252 encoding format, wherein hexadecimal values 8, 9, A, or B matches a first half-byte of the bit mask and one of hexadecimal values 0-F matches a second half-byte of the bit mask.

8. The method of claim 1, wherein the third set of test values matches a bit mask having a format 1110 xxxx, and includes hexadecimal values in Win-1252 encoding format, wherein a first half-byte of the bit mask is always E and one of hexadecimal values 0-F matches a second half-byte of the bit mask.

9. The method of claim 1, further comprising dividing the text comprising characters into one or more two-character or three-character sub-sequences, each sub-sequence including consecutive characters in the received text.

10. The method of claim 9, further comprising storing code point values representing a plurality of two-character and three-character sub-sequences representing text that has not been incorrectly converted from the second encoding format to the first encoding format,
wherein making the determination includes (iii) determining that the sequence of code point values consisting of the first code point value followed by the second code point value is not included in the stored code point values, or (iv) determining that the sequence of code point values consisting of the first code point value followed by the second code point value followed by the third code point value is not included in the stored code point values.

11. A non-transitory computer-readable medium storing computer software instructions executable by a computer system including one or more computers to perform operations comprising:
obtaining a first set of test values, a second set of test values, and a third set of test values;
receiving text comprising characters represented as code point values, the characters identified as being in a first encoding format, each code point value representing one character in the text; and
making a determination that the text likely includes characters incorrectly converted from a second encoding format to the first encoding format, wherein making the determination includes (i) determining for a sequence of code point values consisting of a first code point value followed by a second code point value that the first code point value is in the first set of test values and that the second code point value is in the second set of test values, or (ii) determining for a sequence of code point values consisting of a first code point value followed by a second code point value followed by a third code point value that the first code point value is in the third set of test values, that the second code point value is in the second set of test values, and that the third code point value is in the second set of test values.

12. The non-transitory computer-readable medium of claim 11, wherein making the determination includes the determining of step (i) and the determining of step (ii).

13. The non-transitory computer-readable medium of claim 11, wherein the first encoding format is 8-bit Unicode Transformation Format (UTF-8) and the second encoding format is Windows-1252 (Win-1252).

14. The non-transitory computer-readable medium of claim 13 wherein the sequence of code point values consisting of the first code point value followed by the second code point value followed by the third code point value represents a three-byte character encoded in UTF-8 encoding format.

15. The non-transitory computer-readable medium of claim 11, wherein the first set of test values matches a bit mask having a format 110x xxxx, and includes hexadecimal values in Win-1252 encoding format, wherein hexadecimal values C or D matches a first half-byte of the bit mask and one of hexadecimal values 0-F matches a second half-byte of the bit mask.

16. The non-transitory computer-readable medium of claim 11, wherein the second set of test values matches a bit mask having a format 10xx xxxx, and includes hexadecimal values in Win-1252 encoding format, wherein hexadecimal values 8, 9, A, or B matches a first half-byte of the bit mask and one of hexadecimal values 0-F matches a second half-byte of the bit mask.

17. The non-transitory computer-readable medium of claim 16, wherein the second set of test values further includes hexadecimal values in UTF-8 encoding format, each representing a code point value of a character in Win-1252 encoding format represented by a test value included in the second set of test values.

18. The non-transitory computer-readable medium of claim 11, wherein the third set of test values matches a bit mask having a format 1110 xxxx, and includes hexadecimal values in Win-1252 encoding format, wherein a first half-byte of the bit mask is always E and one of hexadecimal values 0-F matches a second half-byte of the bit mask.

19. The non-transitory computer-readable medium of claim 11, the operations further comprising dividing the text comprising characters into one or more two-character or three-character sub-sequences, each sub-sequence including consecutive characters in the received text.

20. A system comprising:
a computer system including one or more computers; and
a non-transitory computer-readable medium storing computer software instructions executable by the computer system to perform operations including:
obtaining a first set of test values, a second set of test values, and a third set of test values;
receiving text comprising characters represented as code point values, the characters identified as being in a first encoding format, each code point value representing one character in the text; and
making a determination that the text likely includes characters incorrectly converted from a second encoding format to the first encoding format, wherein making the determination includes (i) determining for a sequence of code point values consisting of a first code point value followed by a second code point value that the first code point value is in the first set of test values and that the second code point value is in the second set of test values, or (ii) determining for a sequence of code point values consisting of a first code point value followed by a second code point value followed by a third code point value that the first code point value is in the third set of test values, that the second code point value is in the second set of test values, and that the third code point value is in the second set of test values.

21. The system of claim 20, wherein making the determination includes the determining of step (i) and the determining of step (ii).

22. The system of claim 20, wherein the first encoding format is 8-bit Unicode Transformation Format (UTF-8) and the second encoding format is Windows-1252 (Win-1252).

23. The system of claim 20, wherein the sequence of code point values consisting of the first code point value followed by the second code point value represents a two-byte character encoded in UTF-8 encoding format.

24. The system of claim 20 wherein the sequence of code point values consisting of the first code point value followed by the second code point value followed by the third code point value represents a three-byte character encoded in UTF-8 encoding format.

25. The system of claim 20, wherein the first set of test values matches a bit mask having a format 110x xxxx, and includes hexadecimal values in Win-1252 encoding format, wherein hexadecimal values C or D matches a first half-byte of the bit mask and one of hexadecimal values 0-F matches a second half-byte of the bit mask.

26. The system of claim 20, wherein the second set of test values matches a bit mask having a format 10xx xxxx, and includes hexadecimal values in Win-1252 encoding format, wherein hexadecimal values 8, 9, A, or B matches a first half-byte of the bit mask and one of hexadecimal values 0-F matches a second half-byte of the bit mask.

27. The system of claim 20, wherein the third set of test values matches a bit mask having a format 1110 xxxx, and includes hexadecimal values in Win-1252 encoding format, wherein a first half-byte of the bit mask is always E and one of hexadecimal values 0-F matches a second half-byte of the bit mask.

28. The system of claim 27, wherein the third set of test values further includes hexadecimal values in UTF-8 encoding format, each representing a code point value of a character in Win-1252 encoding format represented by a test value included in the third set of test values.

29. The system of claim 20, the operations further comprising dividing the text comprising characters into one or more two-character or three-character sub-sequences, each sub-sequence including consecutive characters in the received text.

30. A non-transitory computer-readable medium storing computer software instructions executable by a computer system including one or more computers to perform operations comprising:
receiving from a source resource, a plurality of characters of text encoded in a first encoding format at the source resource, the plurality of characters for presenting at a target resource in the first encoding format, wherein characters to be presented at the target resource that are determined to be in a second encoding format are re-encoded into the first encoding format;
determining that a sequence of characters included in the plurality of characters has been re-encoded in the first encoding format causing the characters in the sequence of characters that have been re-encoded to be misrepresented in the target resource;
identifying the misrepresented sequence of characters for rectifying such that the misrepresented sequence of characters are correctly represented in the character encoding format.

* * * * *